(12) United States Patent
Cooks et al.

(10) Patent No.: US 12,505,900 B2
(45) Date of Patent: Dec. 23, 2025

(54) INTEGRATED SYNTHESIS AND ANALYSIS SYSTEMS AND METHODS OF USE THEREOF

(71) Applicant: Purdue Research Foundation, West Lafayette, IN (US)

(72) Inventors: Robert Graham Cooks, West Lafayette, IN (US); Nicolás M. Morato, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 610 days.

(21) Appl. No.: 17/923,709

(22) PCT Filed: Mar. 18, 2021

(86) PCT No.: PCT/US2021/022923
§ 371 (c)(1),
(2) Date: Nov. 7, 2022

(87) PCT Pub. No.: WO2021/236219
PCT Pub. Date: Nov. 25, 2021

(65) Prior Publication Data
US 2023/0187018 A1    Jun. 15, 2023

Related U.S. Application Data

(60) Provisional application No. 63/027,577, filed on May 20, 2020.

(51) Int. Cl.
*G16C 20/20* (2019.01)
*G01N 33/68* (2006.01)
*G16B 15/30* (2019.01)
*G16C 20/50* (2019.01)
*H01J 49/16* (2006.01)

(52) U.S. Cl.
CPC ......... *G16B 15/30* (2019.02); *G01N 33/6851* (2013.01); *G16C 20/20* (2019.02); *G16C 20/50* (2019.02); *H01J 49/165* (2013.01)

(58) Field of Classification Search
None
See application file for complete search history.

(56) References Cited

U.S. PATENT DOCUMENTS

| 5,644,131 A | 7/1997 | Hansen |
| 5,737,498 A | 4/1998 | Murray |
| 6,741,379 B2 | 5/2004 | Kaitoh et al. |
| 6,838,666 B2 | 1/2005 | Ouyang et al. |

(Continued)

FOREIGN PATENT DOCUMENTS

| CN | 110651354 A | 1/2020 |
| WO | 2012/109460 A1 | 8/2012 |

OTHER PUBLICATIONS

Extended European Search Report issued in European Application No. 21808528.0, date of mailing: May 21, 2024, 8 pages.

(Continued)

*Primary Examiner* — Maris R Kessel
*Assistant Examiner* — Mickey Huang
(74) *Attorney, Agent, or Firm* — Brown Rudnick LLP; Adam M. Schoen

(57) ABSTRACT

The invention generally relates to integrated synthesis and analysis systems and methods of use thereof.

10 Claims, 15 Drawing Sheets

(56) References Cited

U.S. PATENT DOCUMENTS

| | | | |
|---|---|---|---|
| 7,335,897 | B2 | 2/2008 | Takats et al. |
| 8,840,848 | B2 | 9/2014 | Kraihanzel |
| 8,932,541 | B2 | 1/2015 | Wiltsie |
| 8,956,570 | B2 | 2/2015 | Wilson et al. |
| 8,962,308 | B2 | 2/2015 | Wilson et al. |
| 8,973,736 | B2 | 3/2015 | Johns et al. |
| 8,996,320 | B2 | 3/2015 | Gwynn et al. |
| 9,046,455 | B2 | 6/2015 | Wilson et al. |
| 9,046,506 | B2 | 6/2015 | Muller et al. |
| 9,140,715 | B2 | 9/2015 | Wilson et al. |
| 9,184,036 | B2 | 11/2015 | Cooks et al. |
| 9,274,132 | B2 | 3/2016 | Wilson et al. |
| 9,285,382 | B2 | 3/2016 | Wilson et al. |
| 9,446,418 | B2 | 9/2016 | Johns et al. |
| 9,482,684 | B2 | 11/2016 | Johns et al. |
| 9,506,943 | B2 | 11/2016 | Müller et al. |
| 9,519,000 | B2 | 12/2016 | Wilson et al. |
| 9,910,054 | B2 | 3/2018 | Johns |
| 10,048,284 | B2 | 8/2018 | Müller et al. |
| 10,274,505 | B2 | 4/2019 | Johns et al. |
| 2001/0014479 | A1 | 8/2001 | Hutchens et al. |
| 2005/0186580 | A1 | 8/2005 | Dellinger et al. |
| 2010/0261159 | A1* | 10/2010 | Hess ............ B01J 19/0046 435/7.1 |
| 2012/0202709 | A1* | 8/2012 | Bergo ............ B01J 19/0046 506/23 |
| 2017/0242030 | A1 | 8/2017 | Novak et al. |
| 2018/0372697 | A1 | 12/2018 | DeWitte et al. |
| 2019/0019662 | A1 | 1/2019 | Cooks et al. |
| 2020/0024633 | A1 | 1/2020 | Stern et al. |
| 2020/0381238 | A1 | 12/2020 | Cooks et al. |

OTHER PUBLICATIONS

Bonner, 1977, The Cylindrical Ion Trap, International Journal of Mass Spectrometry and Ion Physics, 24(3):255-269.

Gao, 2006, Handheld Rectilinear Ion Trap Mass Spectrometer, Anal Chem 78(17):5994-6002.

Gao, 2008, Design and characterization of a multisource hand-held tandem mass spectrometer, Anal Chem, 80:7198-7205.

Hagar, 2002, A new linear ion trap mass spectromer, Rapid Communi. Mass Spectrometry, 16(6):512-526.

Hendricks, 2014, Autonomous in-situ analysis and real-time chemical detection using a backpack miniature mass spectrometer: concept, instrumentation development, and performance, Anal Chem, 86:2900-2908.

Hou, 2011, Sampling Wand for an Ion Trap Mass Spectrometer, Anal. Chem., 83(5):1857-1861.

International Search Report and Written Opinion issued in International Application No. PCT/US2021/022923, date of mailing: May 27, 2021, 8 pages.

Li, 2014, Mini 12, Miniature Mass Spectrometer for Clinical and Other Applications-Introduction and Characterization, Anal Chem, 86(6):2909-2916.

Logsdon, 2020, High-Throughput Screening of Reductive Amination Reactions Using Desorption Electrospray Ionization Mass Spectrometry, Organic Process Research and Development, 24(8):1647-1657.

Sokol, 2011, Miniature mass spectrometer equipped with electrospray and desorption electrospray ionization for direct analysis of organics from solids and solutions, Int. J. Mass Spectrum. 306:187-195.

* cited by examiner

C. Properties of high interest candidate compounds

Raman analysis

Raman allows simple structure confirmation by comparison with predicted spectra

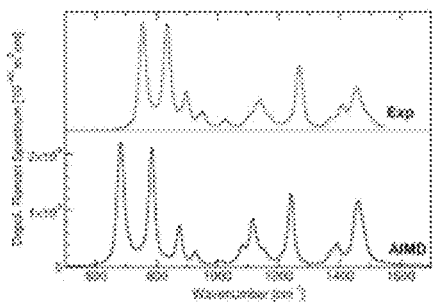

Raman spectra of new compounds can be predicted accurately using DFT calculations

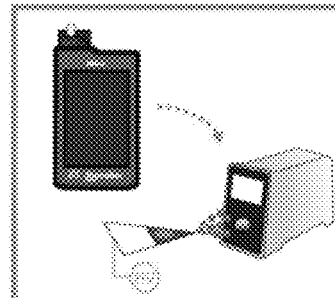

Libraries of Raman and MS/MS spectra are attractive for simplified detection platforms, relevant for instance for forensic applications (e.g. opioid detection)

FIG. 8A

D. Compound libraries *and*
E. Ab initio computations and structure-bioactivity correlations

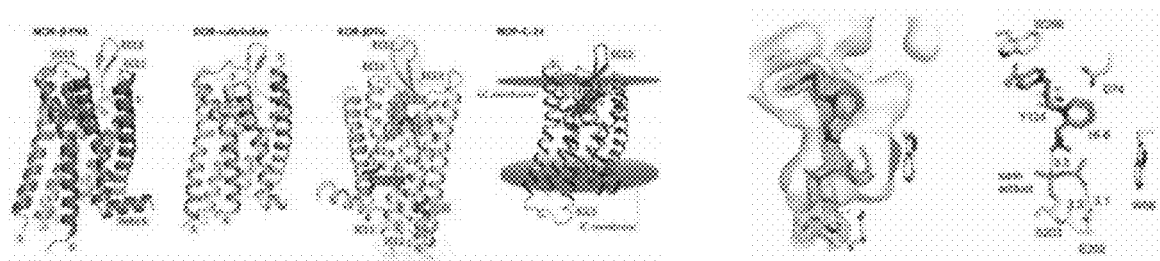

Novel quantum mechanics and molecular dynamic calculations can be used to predict and compare binding affinities to opioid receptors, as well as reactivation capabilities, blood-brain barrier permeation and enzymatic inhibition of oximes.

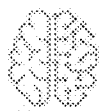 Deep-learning methods and neural-network-based models can be implemented to uncover structure-bioactivity relationships.

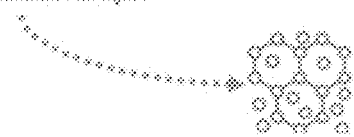 Approximate models (DFT) for identification of unknown compounds and *in silico* design.

FIG. 11A

INTEGRATED SYNTHESIS AND ANALYSIS SYSTEMS AND METHODS OF USE THEREOF

RELATED APPLICATION

The present application is a 35 U.S.C. § 371 national phase application of PCT/US21/22923, filed Mar. 18, 2021, which claims the benefit of and priority to U.S. provisional patent application Ser. No. 63/027,577, filed May 20, 2020, the content of each of which is incorporated by reference herein in its entirety.

GOVERNMENT INTEREST

This invention was made with government support under W911NF-16-2-0020 awarded by the Army Research Office. The government has certain rights in the invention.

FIELD OF THE INVENTION

The invention generally relates to integrated synthesis and analysis systems and methods of use thereof.

BACKGROUND

The drug discovery process underpins the entire pharmaceutical industry, encompassing the early stages of research from target discovery and validation, right through to the identification of a drug candidate or lead compound. Initial identification of small therapeutic candidates comes about via a variety of streams. Research can lead to new insights into disease processes that highlight novel pathways for which drugs can be developed to intervene. Alternatively, companies conduct large scale trial and error-based programs in order to identify molecular compounds that may be of interest. This is the process most often performed during initial lead discovery, with a view to take novel compounds right the way through to preclinical and clinical trials. Thoroughly calculated risk analysis at this point can increase the chances of success when investments into a lead are made.

The drug discovery process from target identification and validation, hit identification and validation, moving from a hit to a lead, lead optimization, and late lead optimization, is a manually driven process that is fragmented and segmented into different manual processes and procedures. Accordingly, drug discovery is a time-consuming inefficient and unsynchronized process that ultimately results in the need for years to develop a commercial drug.

SUMMARY

The invention provides a novel hybrid, high-throughput automated instrumental system that is fully integrated and automated for the synthesis, characterization and bioactivity screening of a vast number of chemical compounds. For example, the integrated system can synthesize and analyze libraries of chemical compounds and then subsequently run various biological assays on such compounds. For example, the system can synthesize a library of compounds and then undertake the assessment of cytotoxicities, together with binding affinities and agonist/antagonist characteristics toward diverse biological targets. In that manner, the systems of the invention are able to provide high-interest chemical candidate leads in the drug discovery process that then can be taken through further biological and clinical studies. Additionally, the platform provides information on synthetic route optimization through the high-throughput reaction screening, allowing for optimal conditions to be translated for scaled-up production in an appropriate regulated facility. Accordingly, systems of the invention coordinate, automate, and synchronism numerous aspects of the drug discovery process and dramatically improve the efficiency of such process.

In certain aspects, the invention provides an integrated synthesis and analysis system that includes multiple different modules. For example, the system may include a chemical synthesis module comprising: one or more instruments for generating arrays of discrete spots on a substrate; and a desorption electrospray ionization (DESI) source for desorbing and ionizing chemical molecules and forming a chemical product from each discrete spot. The system may also include an analysis module comprising a mass spectrometer positioned to receive the desorbed and ionized chemical product from each spot. The system may also include an incubation module configured to incubate the chemical product with one or more biological materials for conducting a biological assay. The system may also include a bioassay module configured to analyze results of the biological assay comprising the chemical product. The system may also include a control apparatus comprising: a fluid handling apparatus comprising one or more robotic instruments configured to handle and move a substrate and handle one or more fluids among the chemical synthesis module, the incubation module, and the bioassay module; and a control module comprising software to control and coordinate operation of each of the chemical synthesis module, the incubation module, and the bioassay module.

In certain embodiments, the control module further comprises software that generates a heat map of the chemical product from each spot to illustrate successful formation of the chemical product for each spot. The software may then analyze the heat map and determine which chemical products should be rescanned for structural information.

In certain embodiments, the chemical synthesis module further comprises: a two-position DESI stage wherein a first position is configured for analysis of the chemical product and is proximate an inlet of the mass spectrometer and a second position located away from the inlet of the mass spectrometer; and a switch controlled by the control module to switch between the first and second position.

The incubation module can be programed via the software to run any type of incubation required for whatever biological assay is to be conducted. In exemplary embodiments, the incubation module is configurable to perform incubation of a biological assay selected from the group consisting of cytotoxicity, enzyme reactivation, antibiotic activity, binding affinity, enzyme inhibition, antiviral activity, agonism/antagonism, and/or blood/brain barrier penetration. In certain embodiments, the incubation module is operably associated with the fluid handling apparatus of the control module and the one or more fluid handling instruments of the chemical synthesis module.

In certain embodiments, the system further comprises a second characterization position that is accessible by the fluid handling apparatus of the control module and that can be operably coupled to the control module. For example, the second characterization position comprises a Raman spectrometer.

In certain embodiments, the bioassay module comprises a multiplexed inductive nano-electrospray and micro-electrophoresis apparatus to achieve rapid in situ sample clean-up and ionization using small volume samples. In such embodiments, the control module may control operation of the multiplexed inductive nano-electrospray and micro-electrophoresis apparatus.

Another aspect of the invention provides methods for forming a chemical product and conducting one or more biological assays on the chemical product. Such methods may involve forming a chemical product in a desorption electrospray ionization (DESI) droplet product from directing a DESI spray from a DESI source onto a substrate to desorb and ionize chemical molecules and form a chemical product, wherein the forming step is conducted for each spot from a surface of an array of spots, analyzing the chemical product in a mass spectrometer, or alternatively or subsequently collecting the chemical product, incubating the chemical product with one or more biological molecules, and analyzing results of the incubation of the chemical product with the one or more biological molecules. All steps of the method are performed by an integrated synthesis and analysis system that comprises a fluid handling apparatus comprising one or more robotic instruments configured to handle and move the chemical product through each step of the method and a control module comprising software to control and coordinate operation of each of the method steps.

In certain embodiments, the control module further comprises software that generates a heat map of the chemical product from each spot to illustrate successful formation of the chemical product for each spot. The software analyzes the heat map and determines which chemical products should be rescanned using conditions that provide for structural information.

In certain embodiments, the forming step further utilizes: a two-position DESI stage wherein a first position is configured for analysis of the chemical product and is proximate an inlet of the mass spectrometer and a second position located away from the inlet of the mass spectrometer; and a switch controlled by the control module to switch between the first and second position.

Any incubation associated with a biological assay is within the scope of the invention. In an exemplary embodiments, the incubation is for one or more biological assays selected from the group consisting of: cytotoxicity, enzyme reactivation, antibiotic activity, binding affinity, enzyme inhibition, antiviral activity, agonism/antagonism, and blood/brain barrier penetration.

In certain embodiments, the method may further comprise a second characterization step in a second characterization position that is accessible by the fluid handling apparatus of the control module and that can be operable coupled to the control module. The second characterization may comprise an analysis by Raman spectroscopy.

In certain embodiments, analyzing results of the incubation comprises use of a multiplexed inductive nano-electrospray and micro-electrophoresis apparatus to achieve rapid in situ sample clean-up and ionization using small volume samples. In such embodiment, the control module may control operation of the multiplexed inductive nano-electrospray and micro-electrophoresis apparatus.

The skilled artisan will appreciate that the systems and methods herein can be used to synthesize and test any type of chemical compound in in any type of biological assay, and the type of chemical compound and the biological assay are non-limiting aspects of the invention. The invention is exemplified for discovery, synthesis, and testing of a chemical product that is a non-addictive pain medication.

BRIEF DESCRIPTION OF THE DRAWINGS

FIG. 8A illustrates a second characterization position that can optionally be coupled and operated via the systems of the invention and FIG. 8B shows additional aspects of a work-flow through the system.

FIG. 11A shows how the data obtained from the system can be used to determine structure—bioactivity correlations and FIG. 11B shows final steps in the workflow using systems of the invention.

DETAILED DESCRIPTION

Figure 1:
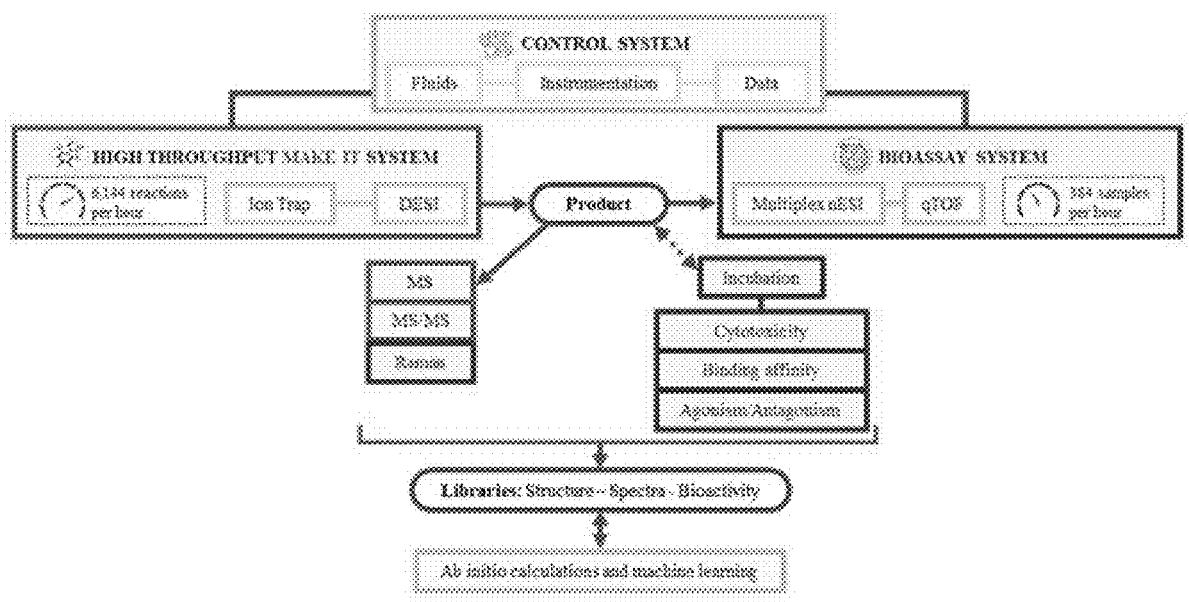
FIG. 1 shows an exemplary embodiment of a novel hybrid, high-throughput automated instrumental system.

The invention generally relates to integrated synthesis and analysis systems and methods of use thereof. FIG. 1 shows an exemplary embodiment of a novel hybrid, high-throughput automated instrumental system. As shown in FIG. 1, the system may include a chemical synthesis module comprising: one or more instruments for generating arrays of discrete spots on a substrate; and a desorption electrospray ionization (DESI) source for desorbing and ionizing chemical molecules and forming a chemical product from each discrete spot. The system may also include an analysis module comprising a mass spectrometer positioned to receive the desorbed and ionized chemical product from each spot. The system may also include an incubation module configured to incubate the chemical product with one or more biological materials for conducting a biological assay. The system may also include a bioassay module configured to analyze results of the biological assay comprising the chemical product. The system may also include a control apparatus comprising: a fluid handling apparatus comprising one or more robotic instruments configured to handle and move a substrate and handle one or more fluids among the chemical synthesis module, the incubation module, and the bioassay module; and a control module comprising software to control and coordinate operation of each of the chemical synthesis module, the incubation module, and the bioassay module.

FIG. 1 also includes an optional aspect of the system, which is optionally a second characterization position that is accessible by the fluid handling apparatus of the control module and that can be operable coupled to the control module. As shown by example in FIG. 1, the second characterization position may comprise a Raman spectrometer, which is only exemplary and non-limiting of the possible options for the second characterization position.

Figure 2A:
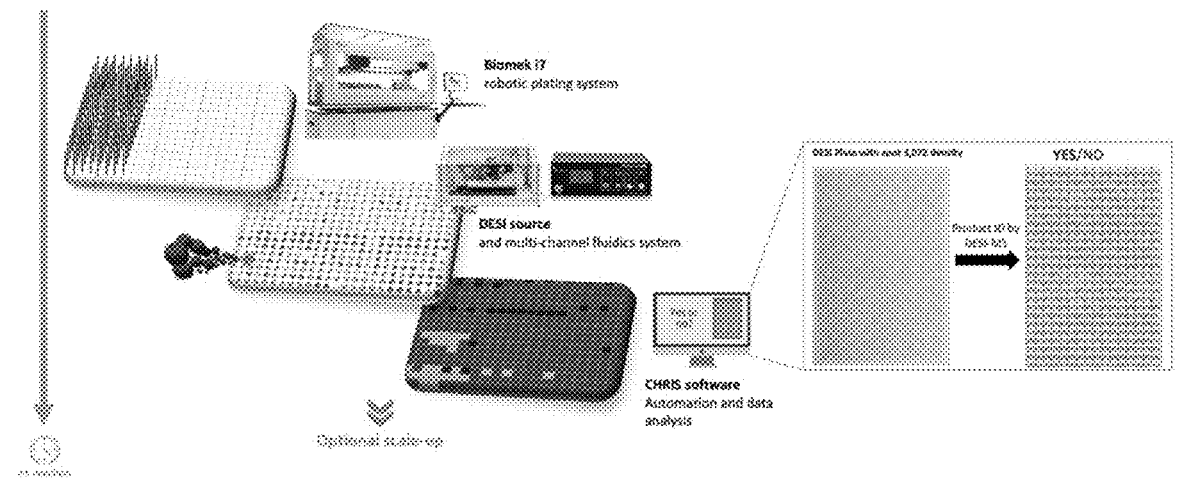
FIG. 2A shows an exemplary chemical synthesis module and FIG. 2B illustrates an exemplary workflow in such module.
Figure 2B:
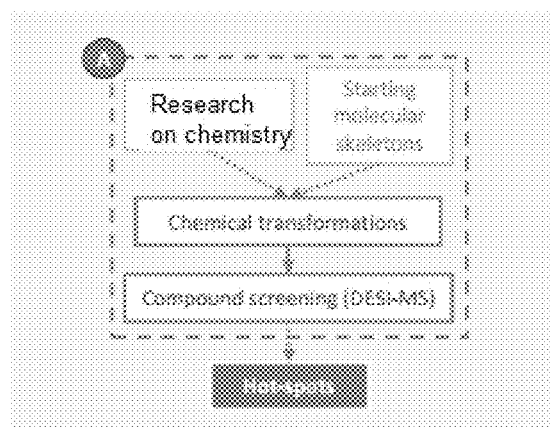

FIG. 2A shows an exemplary chemical synthesis module and FIG. 2B illustrates an exemplary workflow in such module. The module is a high-throughput platform that combines a set of interrelated methods in which mass spectrometry methods may be used to create droplets and thin films in which accelerated reactions occur, while simultaneously or subsequently using mass spectrometry to analyze the product distribution in the droplets and/or thin films. This platform has broad applicability to many different chemical and biological systems. The fluid handling system controls sample handling and generates microwell plates of various sizes, exemplified here as a 384 well plate. The fluid handling system using a pinning device interacts with the microwell plate to generate a substrate of discrete spots, using for example a pinning device. A DESI source is integrated as part of the system and directed a DESI active spray discharge onto each of the spots sequentially. The spray discharge desorbs and ionizes analytes from each spot, which are directed into a mass spectrometer for analysis. This high-throughput system has the capability of screen reaction products of interest atl second per reaction (or less) in a system capable of 24-hour continuous operation.

As shown in FIG. 2A, in certain embodiments, the control module further comprises software that generates a heat map of the chemical product from each spot to illustrate successful formation of the chemical product for each spot. The software may then analyze the heat map and determine which chemical products should be rescanned for structural information.

Figure 3:
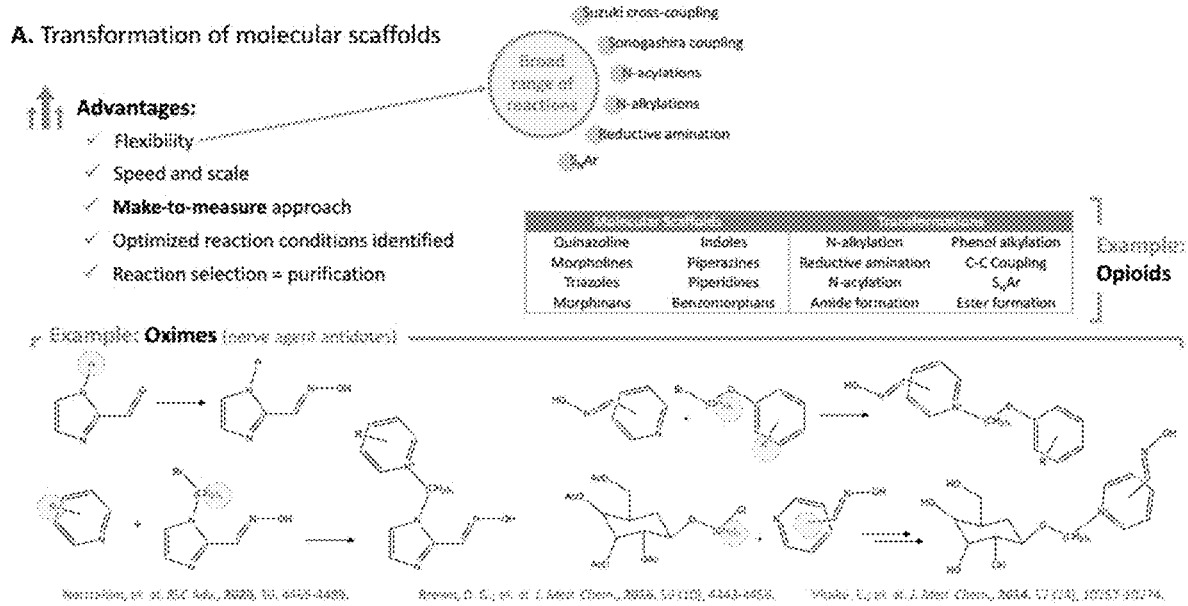
FIG. 3 illustrates various different exemplary reaction types that can be performed by the chemical reaction module and various exemplary types of chemical products that may be produced by such module.

Numerous different chemical compounds and reactions can be conducted in the chemical synthesis module. FIG. 3 illustrates various different exemplary reaction types that can be performed by the chemical reaction module and various exemplary types of chemical products that may be produced by such module.

Figure 4A:
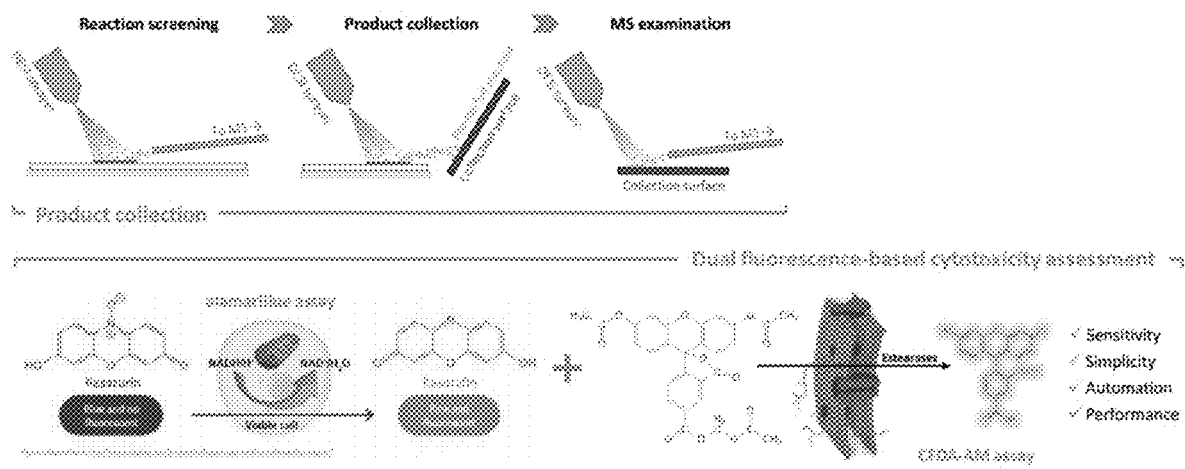
FIG. 4A illustrates a two-position DESI stage and FIG. 4B shows additional aspects of a work-flow through the system.

In certain embodiments, the chemical synthesis module further comprises: a two-position DESI stage wherein a first position is configured for analysis of the chemical product and is proximate an inlet of the mass spectrometer and a second position located away from the inlet of the mass spectrometer; and a switch controlled by the control module to switch between the first and second position (FIG. 4A). To achieve high-throughput screening of properties, the system is configured to allow collection of the synthetized products using a DESI-spray-angle switching approach (as described herein). In short, a new DESI stage, with two positions (analysis: close to the MS inlet, and collection: away from the MS) is used. The analysis position is used for reaction screening in high-density plates, while the collection position is used to deposit the product on lower-density well-plates. With this approach, perhaps 10% of the reactions screened would yield hot-spots in a typical plate, and approximately 1-2 ng of product will be deposited.

Figure 4B:
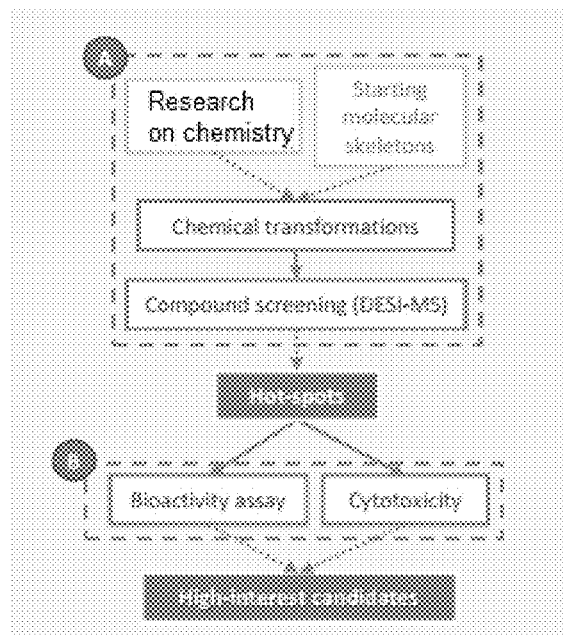

FIG. 4B then shows additional aspects of the workflow within the systems and methods of the invention. At this point, hotspots, (chemical compounds of interest) have been identified and the system, via the control module and fluid handling apparatus and optionally instruments of the chemical module, is ready to engage the incubation module for incubating the chemical product and biological molecules for a bioassay. The incubation module can be programed via the software to run any type of incubation required for whatever biological assay is to be conducted. In exemplary embodiments, the incubation module is configurable to perform incubation of a biological assay selected from the group consisting of cytotoxicity, enzyme reactivation, antibiotic activity, binding affinity, enzyme inhibition, antiviral activity, agonism/antagonism, and/or blood/brain barrier penetration. In certain embodiments, he incubation module is operably associated with the fluid handling apparatus of the control module and the one or more fluid handling instruments of the chemical synthesis module. FIG. 4B illustrates exemplary bioassays, e.g. cytotoxicity, which is described in more detail in the Examples below.

Figure 5:
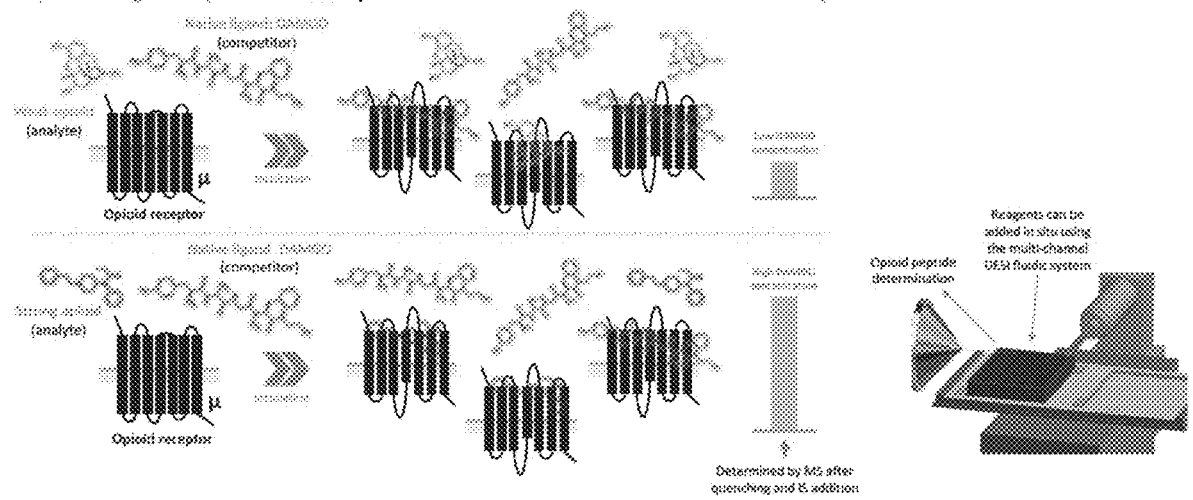
FIG. 5 illustrates in an exemplary manner how the fluid handling components of the system operate together to prepare chemical products and biological molecules in the incubation molecule for a bioassay and subsequent analysis in a mass spectrometer.
Figure 6:
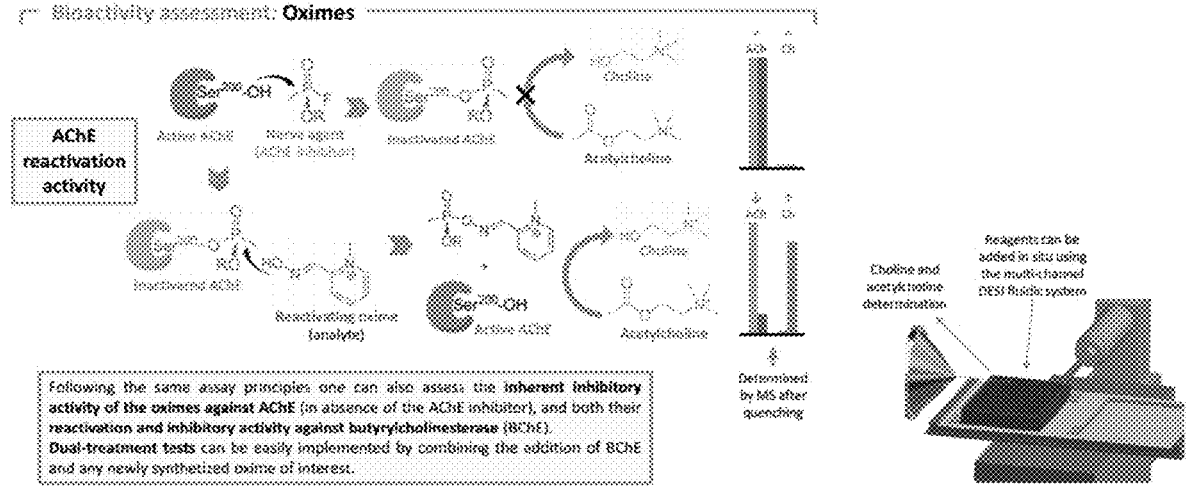
FIG. 6 illustrates in another embodiment how the fluid handling components of the system operate together to prepare chemical products and biological molecules in the incubation molecule for another bioassay and subsequent analysis in a mass spectrometer.

FIG. 5 illustrates in an exemplary manner how the fluid handling components of the system operate together to prepare chemical products and biological molecules in the incubation molecule for a bioassay and subsequent analysis in a mass spectrometer. FIG. 6 illustrates in another embodiment how the fluid handling components of the system operate together to prepare chemical products and biological molecules in the incubation molecule for another bioassay and subsequent analysis in a mass spectrometer.

In certain embodiments, the bioassay module comprises a multiplexed inductive nano-electrospray and micro-electrophoresis apparatus to achieve rapid in situ sample clean-up and ionization using small volume samples. In such embodiments, the control module may control operation of the multiplexed inductive nano-electrospray and micro-electrophoresis apparatus. That is illustrated in in FIG. 7.

Figure 8B:
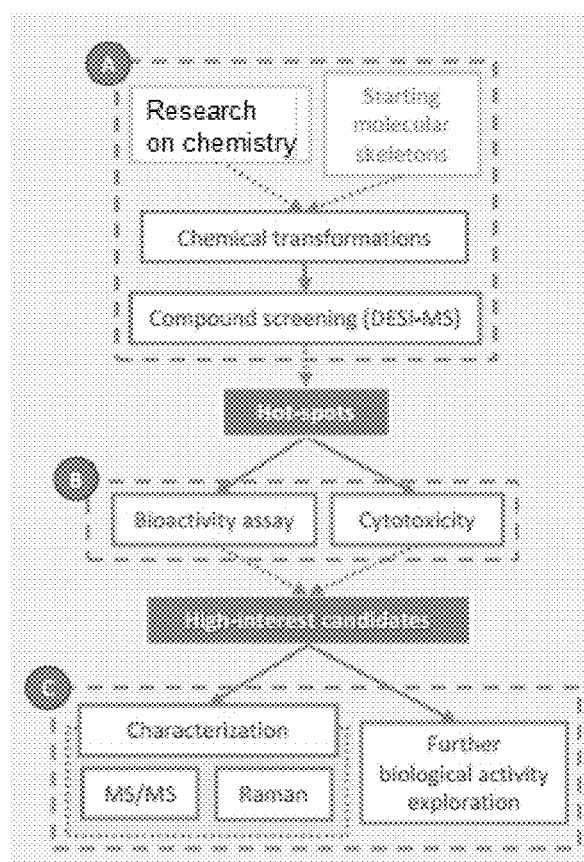
Figure 9:
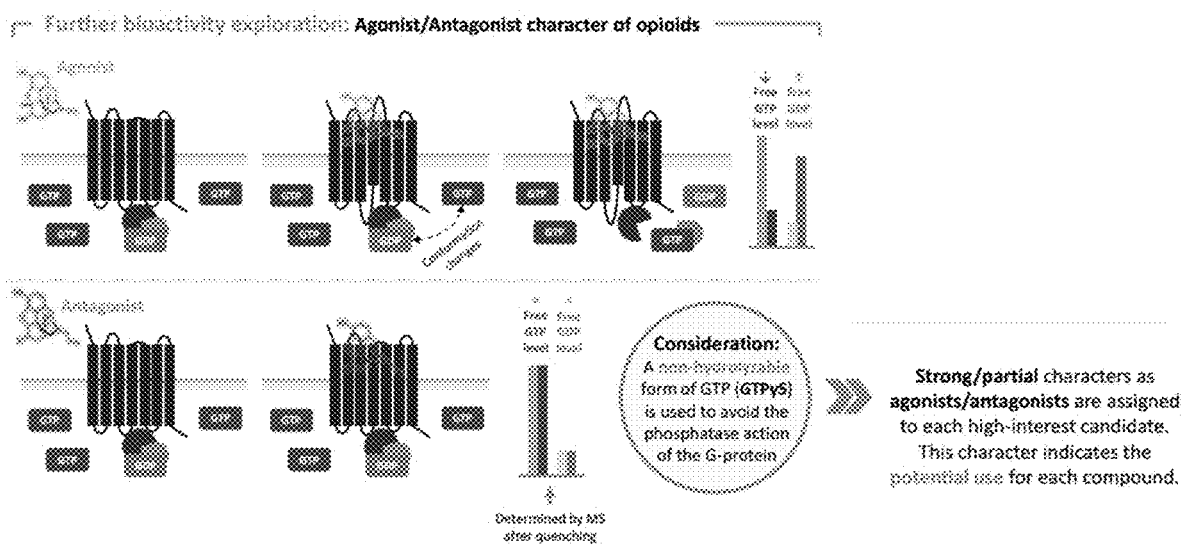
FIGS. 9-10 further show the characterization and additional biological activity exploration that can be achieved via the second characterization position.
Figure 10:
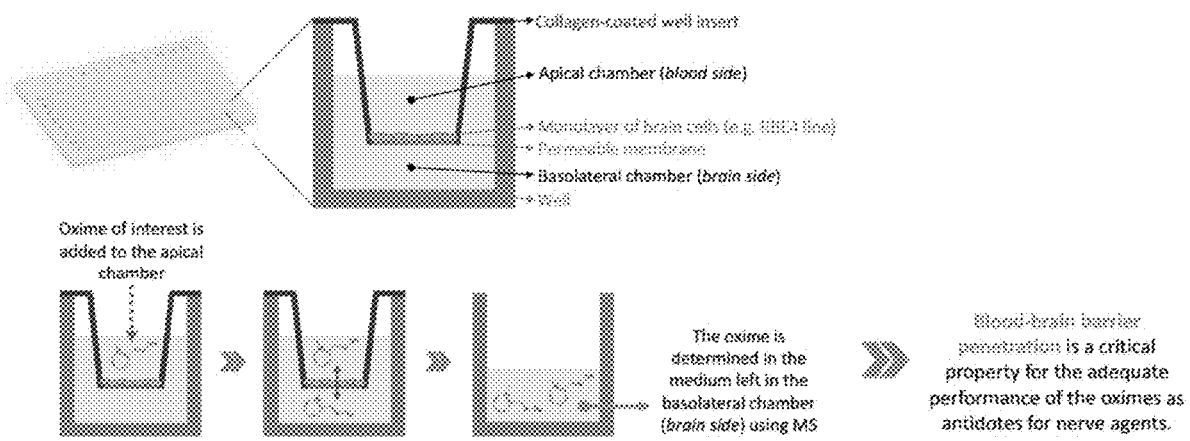

FIG. 8A illustrates a second characterization position that can optionally be coupled and operated via the systems of the invention and FIG. 8B shows additional aspects of a work-flow through the system. The second characterization position is accessible by the fluid handling apparatus of the control module and can be operable coupled to the control module. As shown by example in FIG. 8A, the second characterization position comprises a Raman spectrometer. FIGS. 9-10 further show the characterization and additional biological activity exploration that can be achieved via the second characterization position.

Figure 11B:
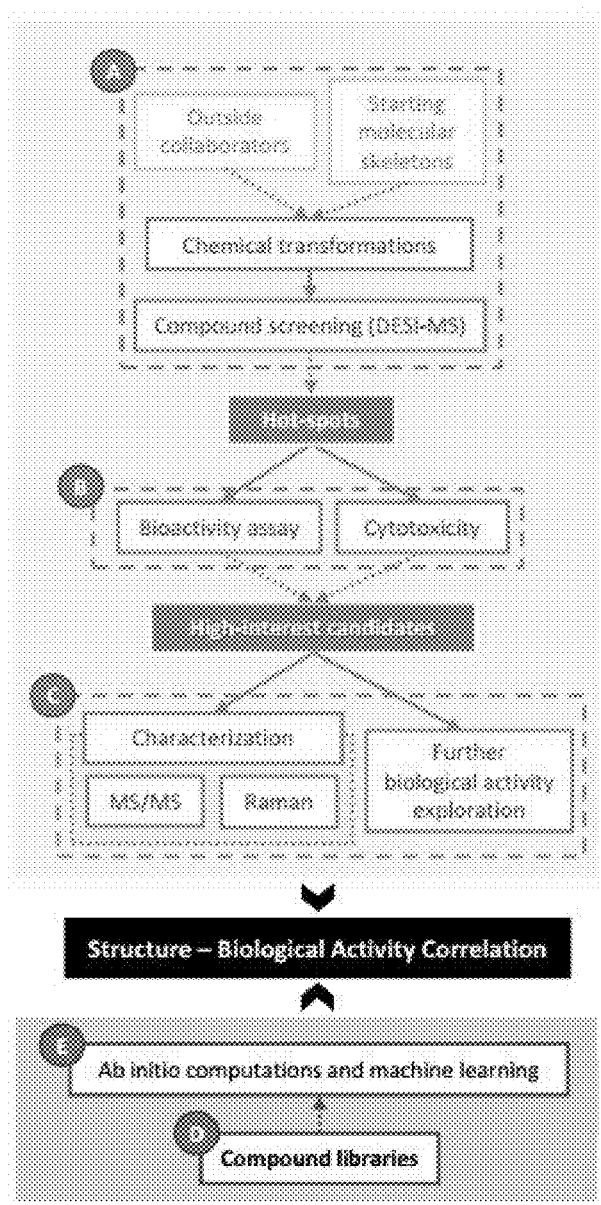

FIG. 11A shows how the data obtained from the system can be used to determine structure—bioactivity correlations and FIG. 11B shows final steps in the workflow using systems of the invention. Particularly, deep learning methods and neural-network-based models can be implements to uncover structure—bioactivity correlations.

Fluid Handling

Any fluid handling instrument known in the art can be used in systems of the invention. In certain embodiments, the liquid handling instrument is a Biomek liquid handler (for example I-series) as produced and sold by Beckman Coulter. Description of such liquid handler are described for example in U.S. Pat. Nos. 10,274,505; 10,048,284; 9,910, 054; 9,519,000; 9,506,943; 9,482,684; 9,446,418; 9,285, 382; 9,274,132; 9,140,715; 9,046,506; 9,046,455; 8,996, 320; 8,973,736; 8,962,308; 8,956,570; 8,932,541; 8,840, 848; 6,841,379; and 5,737,498, the content of each of which is incorporated by reference herein in its entirety.

Microelectrophoresis

Micro-electrophoretic probes and systems are described further for example in U.S. patent application publication number 2019/0019662, the content of which is incorporated by reference herein in its entirety. In certain aspects, the invention makes use of electrophoretic forces to displace interfering solution-phase ions prior to chemical analysis, i.e., move solution-phase ions to a region of the solution remote from the sprayer. In certain embodiments, the probes of the invention employ two electrodes to create an electrophoretic field by means of which ions, such as $H^+$, $Na^+$, $K^+$, $Br^-$, $Cl^-$, $Acetate^-$, $Formate^-$, etc., can be manipulated. Except for $H^+$ and $OH^-$, these solution phase ions cause deleterious effects during mass spectrometric (MS) analysis by causing a single analyte (M) to have multiple signals (e.g., $M+M^+$, $Na^+$, $M+Na^+$, and $M+K^+$), or by suppressing analyte signals altogether. These adducts not only lower the signal of the analyte, but also result in cluster formation, congested spectra and reduced sensitivity of the MS analyzer. The electrophoretic probes of the invention remove ions from the region from which the analytical spray occurs. The removal is not permanent but persists for long periods and as such it allows mass spectrometry to be performed under normal conditions.

To perform the desalting process, a hollow conduit and an electrode are inserted into a hollow body of a mass spectrometry probe having a distal tip. The hollow conduit is electrically conductive and may be operably coupled to a power source and a reservoir that holds a liquid sample. A distal end of the hollow conduit is positioned in the hollow body to be in contact with the liquid sample that is expelled from the hollow conduit. A separate electrode is placed at the rear of the emitter, not in contact with the liquid sample but connected inductively (e.g., a distal end of the electrode is located at a different distance from the distal tip of the hollow body than a distal end of the hollow conduit, e.g., farther away)). A voltage is applied to the hollow conduit as it transports the liquid sample from the reservoir into the hollow body. The hollow conduit polarizes the liquid sample as the liquid sample flows through the hollow conduit and into the hollow body. This generates a charge body of solution which is connected via the external hollow conduit to one pole of the power supply. In this manner, the liquid sample may act as an electrode. When the appropriate electrical potentials (e.g., DC potentials) are applied to the electrode, the ions migrate to the rear of the capillary, away from the tip of the hollow body. After a short period, the electrode is turned off while voltage is still supplied to the hollow conduit, which electrical charge continues to be imparted to the liquid sample in the hollow body, even if there is not flow or liquid in the hollow conduit. The spectrum generated has signals related primarily to protonated molecules ($M+H^+$) and minimal signal resulting from cation adducts of the molecule or from cationic salt clusters. The same experiment can be applied to negative ions using an opposite polarity on the electrodes. The mass spectrometry probe of the invention has been used to improve the analytical performance in the analysis of therapeutic pharmaceuticals, peptides, proteins, and contaminants often found in waste streams.

In certain embodiments, the invention probes an electrophoretic, multi-electrode mass spectrometry probe (e.g., a nano-ESI probe) that operates to rapidly desalt matrices without the addition of any chemical modifiers. The setup, as described herein, is a small capillary which may contain a liquid, such as water. The analyte, is delivered to the tip of the capillary, optionally via a syringe pump (e.g., sample reservoir), connected to an insulated fused silica line (e.g., electrically conductive hollow conduit) for two minutes (4 μL/min). A high voltage connector, HV1, which delivers 1.5 kV to the front of the capillary through conduction of the solvent insulated line via the syringe pump. In certain embodiments, HV1 may be equivalent to a typical spray voltage in any spray based ionization source. The second electrode, HV2, is inside the glass capillary, but not in contact with the solvent (ca 5 mm air gap). As shown, HV1 and HV2 each terminate at different distances from a distal tip of the hollow capillary. In the exemplified embodiment, HV2 terminates closer to a rear of the capillary than HV1.

The body of the mass spectrometry probe is a hollow unitary body. This is exemplary and not required in all embodiments. In the context of the invention, unitary refers to the fact that walls of the body of the mass spectrometry probe include no breaks, cuts, or disconnected regions. Rather, the walls of the probe run continuously from the distal tip of the probe to a rear of the probe without any breaks, cuts, or disjointed regions. In that manner, the mass spectrometry probes can operate without the formation of a liquid bridge or any other connector that would be required to connect to parts of a disjointed non-unitary probe body. Similarly, the methods of the invention can be performed without the need for a liquid bridge in the probe set-up.

Without being limited to any particular theory or mechanism of action, in-source desalting typically occurs in three steps. For positive mode analysis, HV1 is set to (+)1.5 kV and the syringe pump is operated as described above. The data gathered during step 1 is a typical spectrum that contains $M+M^+$, $M+Na^+$ and $M+K^+$ species. Next, a second potential, HV2, is applied inductively to a rear of the solvent meniscus, ranging from −3 kV to −5 kV. While on, the positive ion signal is depleted due to the high negative electric field which sequesters the positive ions to the rear of the capillary. After a time period, (e.g., 1 minute (exemplary time period)), voltage from HV2 is removed (voltage is terminated) and solution-phase ions proceed to the front of the emitter; however, due to mobility, the protons reach the tip of the emitter before $Na^+$ and $K^+$ resulting in a spectrum containing primarily protonated ions.

Desorption Electrospray Ionization

Desorption electrospray ionization (DESI) is described for example in Takats et al. (U.S. Pat. No. 7,335,897), the content of which is incorporated by reference herein in its entirety. DESI allows ionizing and desorbing a material (analyte) at atmospheric or reduced pressure under ambient conditions. A DESI system generally includes a device for generating a DESI-active spray by delivering droplets of a liquid into a nebulizing gas. The system also includes a means for directing the DESI-active spray onto a surface. It is understood that the DESI-active spray may, at the point of contact with the surface, include both or either charged and uncharged liquid droplets, gaseous ions, molecules of the nebulizing gas and of the atmosphere in the vicinity. The pneumatically assisted spray is directed onto the surface of a sample material where it interacts with one or more analytes, if present in the sample, and generates desorbed ions of the analyte or analytes. The desorbed ions can be directed to a mass analyzer for mass analysis, to an IMS device for separation by size and measurement of resulting voltage variations, to a flame spectrometer for spectral analysis, or the like.

In this system, a spray is generated by a conventional electrospray device. The device includes a spray capillary through which the liquid solvent is fed. A surrounding nebulizer capillary forms an annular space through which a nebulizing gas such as nitrogen ($N_2$) is fed at high velocity. In one example, the liquid was a water/methanol mixture and the gas was nitrogen. A high voltage is applied to the liquid solvent by a power supply via a metal connecting element. The result of the fast-flowing nebulizing gas interacting with the liquid leaving the capillary is to form the DESI-active spray comprising liquid droplets. DESI-active spray also may include neutral atmospheric molecules, nebulizing gas, and gaseous ions. Although an electrospray device has been described, any device capable of generating a stream of liquid droplets carried by a nebulizing gas jet may be used to form the DESI-active spray.

The spray is directed onto the sample material which in this example is supported on a surface. The desorbed ions leaving the sample are collected and introduced into the atmospheric inlet or interface of a mass spectrometer for analysis by an ion transfer line which is positioned in sufficiently close proximity to the sample to collect the desorbed ions. Surface may be a moveable platform or may be mounted on a moveable platform that can be moved in the x, y or z directions by well-known drive means to desorb and ionize sample at different areas, sometimes to create a map or image of the distribution of constituents of a sample. Electric potential and temperature of the platform may also be controlled by known means. Any atmospheric interface that is normally found in mass spectrometers will be suitable for use in the invention. Good results have been obtained using a typical heated capillary atmospheric interface. Good results also have been obtained using an atmospheric interface that samples via an extended flexible ion transfer line made either of metal or an insulator.

Multiplexing and Inductive Charging

In certain embodiments, multiplexing on sample loading and analysis is used in the systems and methods of the invention, optionally using inductive charging for analysis. Such approaches are described for example in U.S. patent application publication number 2020/0381238, the content of which is incorporated by reference herein in its entirety. In certain embodiments, the induced DC nESI ionization source includes a 3D electrical controlled moving platform, emitter holder and a pogo pin holder. In such embodiments, the emitter holder is preloaded with 96 emitters and samples. The emitter holder is attached to the 3D moving stage by a 3D printed connector. The emitter holder is designed to easily attached and detached from the moving stage for convenience of sample introduction and cleaning. The front (side facing the MS inlet) of the emitter holder has 96 holes to hold 96 emitters. Inside the holes, there are 96 individual electrodes with the same length as the emitter holder. When loading the emitters into the holder, these electrodes are inserted into the emitters but do not reach the sample solution. The other ends of the electrodes go from the rear (side opposite from the MS inlet) and are soldered to a PCB with 96 holes. On the PCB, there are 96 isolated copper layers electrically in contact with the 96 electrodes by soldering. A pogo pin electrode placed behind the PCB is aligned with the MS inlet. The position of the pogo pin electrode is fixed by the pogo pin holder on a fixed arm of the 3D moving stage. The pogo pin electrode touches the PCB. When the device is running, the motion control system first goes to the top right starting point and moves in the vertical y-direction to find the first row of emitters and then moves in the horizontal x-direction to analyze samples in the first row in sequence. When an emitter is aligned with the MS inlet, the pogo pin touches the corresponding copper layer on the PCB and 2~3.5 kV volts is applied to the electrode for induced DC nESI ionization of the sample in the tip of the emitter. Note that the electrode does not contact the sample so ionization is induced. Because the flow rate in inductive nESI is very low, so there is enough time to record the high-quality MS data in spite of very small sample volume.

To solve the problem of sample introduction presented by the traditional nESI work flow, we have developed a "dip and go" strategy using a multiplexed system. In such an approach, 96 emitters with 20-micron tip size are preloaded into the emitter holder. The size of the holder is designed to correspond to the size of the standard 96-well plate and the position of each emitter corresponds to the position of each well in the 96-well plate. To load the sample, one holds the emitter holder and lets the side with emitters face the 96-well plate, lowers the holder and allows every emitter to be immersed into sample solution for 10 seconds and then lifts the holder. This procedure can be done manually or with a robot. The amount of sample solution introduced into emitter is ca. 100 nL. Sample loading amounts can be varied by using different loading times.

Induced electrophoretic cleaning ("desalting") can be applied to the samples on the emitters prior to sample analysis to achieve better analytical performance for samples with a complex matrix. By applying voltage (e.g., more than 5 kV, with either the same or opposite polarity to that used for nESI analysis) to the electrodes simultaneously, the high electrical field induced in the sample in the emitter tip will cause electrophoresis. Ions with large ionic mobility such as anions and cations from simple salts in the solution will migrate towards the two ends of the solution, leaving substances with small ionic mobility such as peptides will remain essentially in their original positions and will be subject to selective ionization.

To perform offline electrophoretic cleaning one holds the emitter holder and allows the copper layer of the PCB touch a copper plate connected to the high voltage output of a power supply. At 0.5 to 1 cm distance from the emitter tip, another copper plate which is grounded is placed so as to set up a large potential change in the sample solution to initiate electrophoresis. The electrophoresis is maintained for 10 seconds and then the emitter holder is re-installed onto the back to the 3D moving stage platform. Following the same steps described in section A one records spectra of the cleaned samples. This method is more convenient but slightly slower (because cleaning slightly slows the rate of motion used for ionization).

The alternative to offline cleaning is to perform online cleaning using one HV supply for cleaning and a second one for ionization. To perform online electrophoretic cleaning, the emitter holder is attached to the moving stage. When performing the cleaning, the moving stage allows the emitter holder to move from left to right. The left pogo pin on a pogo pin holder is supplied with −6 kV volts to induce electrophoretic cleaning of the sample that points towards the grounded counter electrode. Subsequently, after cleaning, the emitter moves and is aligned with the MS inlet at which point the right pogo pin electrode with 2 to 3.5 kV volts applied to the pogo pin holder initiates inductive nESI analysis of sample in the emitter by the same process described in A. This method is faster and the sample screening rate can be maximized.

As mentioned above, inductive charging can be useful in a multiplex analysis setting. Inductive charging is further described for example in U.S. Pat. No. 9,184,036, the content of which is incorporated by reference herein in its entirety. In inductive charging the probe includes a spray emitter and a voltage source and the probe is configured such that the voltage source is not in contact with the spray emitter or the spray emitted by the spray emitter. In this manner, the ions are generated by inductive charging, i.e., an inductive method is used to charge the primary microdroplets. This allows droplet creation to be synchronized with the opening of the sample introduction system (and also with the pulsing of the nebulizing gas). Inductive nESI can be implemented for various kinds of nESI arrays due to the lack of physical contact. Examples include circular and linear modes. In an exemplary rotating array, an electrode placed mm from each of the spray emitters in turn is supplied with a 2-4 kV positive pulse (10-3000 Hz) giving a sequence of ion signals. Simultaneous or sequential ions signals can be generated in the linear array using voltages generated inductively in adjacent nESI emitters. Nanoelectrospray spray plumes can be observed and analytes are detected in the mass spectrum, in both positive and negative detection modes. In the electrophoretic clean-up working mode, direct current voltage source (1.5-6 kV) was used to induce nanoelectrospray. Different from the previous example induced by alternating current voltage, the induced electrical field keeps the same direction in this mode, which ensures efficient electrophoretic cleaning performance.

Ion Traps and Mass Spectrometers

Any ion trap known in the art can be used in systems of the invention. Exemplary ion traps include a hyperbolic ion trap (e.g., U.S. Pat. No. 5,644,131, the content of which is incorporated by reference herein in its entirety), a cylindrical ion trap (e.g., Bonner et al., International Journal of Mass Spectrometry and Ion Physics, 24(3):255-269, 1977, the content of which is incorporated by reference herein in its entirety), a linear ion trap (Hagar, Rapid Communications in Mass Spectrometry, 16(6):512-526, 2002, the content of which is incorporated by reference herein in its entirety), and a rectilinear ion trap (U.S. Pat. No. 6,838,666, the content of which is incorporated by reference herein in its entirety).

Any mass spectrometer (e.g., bench-top mass spectrometer of miniature mass spectrometer) may be used in systems of the invention and in certain embodiments the mass spectrometer is a miniature mass spectrometer. An exemplary miniature mass spectrometer is described, for example in Gao et al. (Anal. Chem. 2008, 80, 7198-7205.), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 m3/hr) diaphragm pump and a 11 L/s turbo pump for the system described in Gao et al. Other exemplary miniature mass spectrometers are described for example in Gao et al. (Anal. Chem., 2008, 80, 7198-7205.), Hou et al. (Anal. Chem., 2011, 83, 1857-1861.), and Sokol et al. (Int. J. Mass Spectrom., 2011, 306, 187-195), the content of each of which is incorporated herein by reference in its entirety.

The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 9. It may have a size similar to that of a shoebox (H20 cm×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

System Architecture

In certain embodiments, the systems and methods of the invention can be carried out using automated systems and computing devices. Specifically, aspects of the invention described herein can be performed using any type of computing device, such as a computer, that includes a processor, e.g., a central processing unit, or any combination of computing devices where each device performs at least part of the process or method. In some embodiments, systems and methods described herein may be controlled using a handheld device, e.g., a smart tablet, or a smart phone, or a specialty device produced for the system.

Systems and methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected through network by any form or medium of digital data communication, e.g., a communication network. For example, the reference set of data may be stored at a remote location and the computer communicates across a network to access the reference set to compare data derived from the female subject to the reference set. In other embodiments, however, the reference set is stored locally within the computer and the computer accesses the reference set within the CPU to compare subject data to the reference set. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript.

A computer program does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

Figure 14:
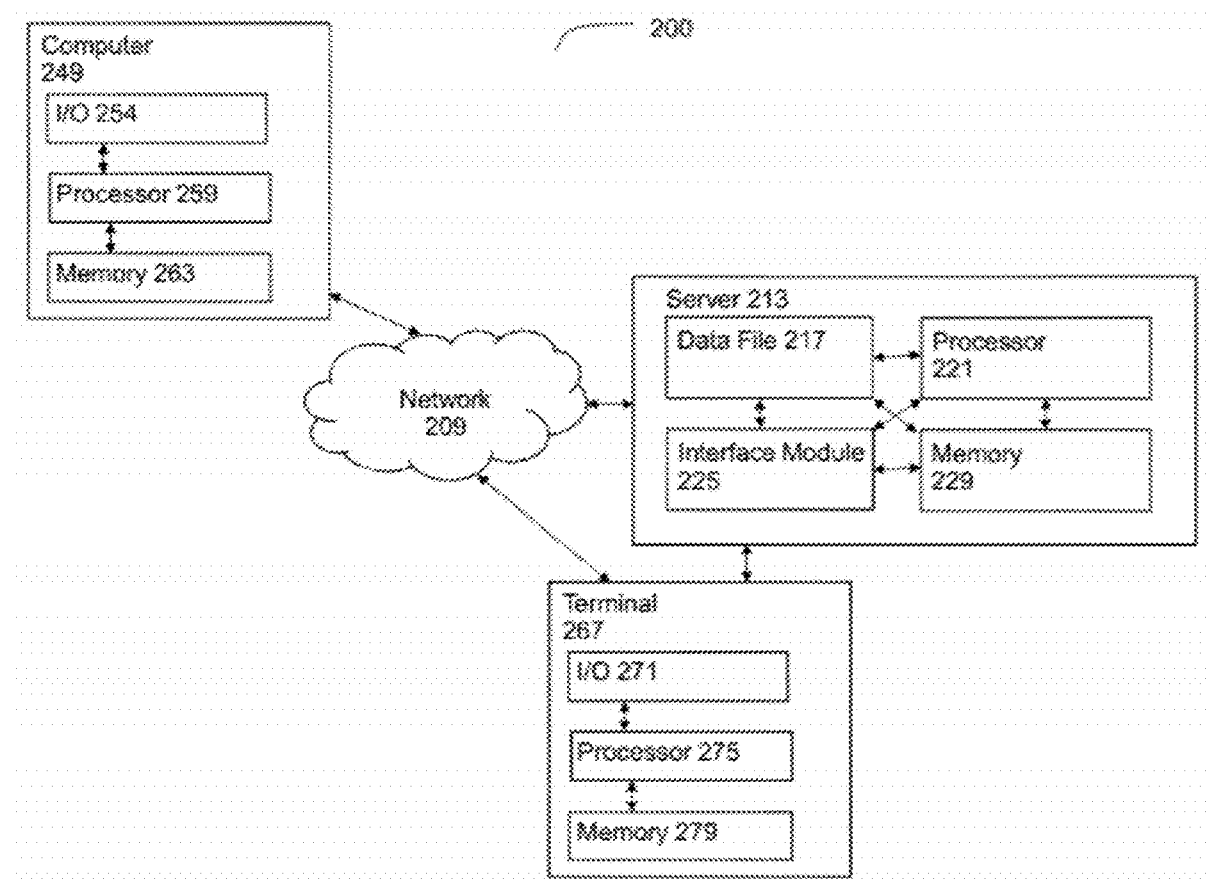
FIG. 14 is an illustration showing an exemplary data analysis module for implementing the systems and methods of the invention in certain embodiments.

In an exemplary embodiment shown in FIG. 14, system 200 can include a computer 249 (e.g., laptop, desktop, or tablet). The computer 249 may be configured to communicate across a network 209. Computer 249 includes one or more processor 259 and memory 263 as well as an input/output mechanism 254. Where methods of the invention employ a client/server architecture, steps of methods of the invention may be performed using server 213, which includes one or more of processor 221 and memory 229, capable of obtaining data, instructions, etc., or providing results via interface module 225 or providing results as a file 217. Server 213 may be engaged over network 209 through computer 249 or terminal 267, or server 213 may be directly connected to terminal 267, including one or more processor 275 and memory 279, as well as input/output mechanism 271.

System 200 or machines according to the invention may further include, for any of I/O 249, 237, or 271 a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 263, 279, or 229 according to the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

EXAMPLES

The invention is now described herein for use in an exemplary manner for synthesis and analysis of new chemical compounds that may be used as non-addictive pain medication.

Example 1

The opioid crisis is a well-documented and profound epidemic in North America that is expanding rapidly around the world. Currently considered a profound public health emergency. The origins of the epidemic can be found in the prescription of opioids, which increased dramatically at the end of the 20th century as a treatment for acute chronic pain. Today this challenge is far more complicated with multiple sustaining forces and higher risks to the population. This is instanced in the street availability of strong synthetic opioids, like fentanyl and its analogues, especially as additives in more traditional and weaker preparations (e.g., heroin). Until 2013, these compounds were represented only in sporadic outbreaks, but since then, synthetic opioids have caused deaths in every US state and have infiltrated the traditional street drug supply, being particularly dangerous to unsuspecting consumers. Furthermore, their inclusion as scheduled substances has been ineffective because, as some are regulated, new synthetic opioids (which are not detected by traditional drug testing approaches) appear on the market.

In this context, it is vital to address the opioid crisis as a chemical problem that consequently requires as part of its solution new chemical knowledge, which is only obtainable through chemical experiments. Under this premise, we propose a chemical study ultimately targeted towards our main goal of addressing the opioid epidemic by contributing to the development of non-addictive but highly effective pain medications, as well as more efficient overdose reversal strategies and improved forensic capabilities for detection of new synthetic opioids, using an automated high-throughput platform capable of synthesis, characterization and bio-analysis of a large number of new opioid-related compounds. This platform is described in FIG. 1.

In a first step, the systems of the invention are used to synthesize nanogram amounts of a large number of opioid related compounds by modifying pharmacologically active scaffolds. The resulting compounds will not be purified, but rather will be subjected to a preliminary, in situ, molecular structural characterization using tandem mass spectrometry (MS/MS). Their cytotoxicities and binding affinities to opioid receptors will also be measured in situ. Compounds of high interest (low cytotoxicity, high binding affinity) will be prepared in larger but sub-milligram scale, and via the systems of the invention, their Raman spectra and opioid receptor agonist/antagonist characteristics will be measured in situ, as well. Advances in pain and overdose treatment have been widely recognized as a fundamental aspect of the fight against the opioid crisis. First, they allow the prescription of safer analgesics so that opioid misuse can be prevented, while addressing at the same time the need for treatment of patients with chronic pain. Second, they make available stronger antagonists that can be used to efficiently counteract high-potency opioid overdoses and thus help save lives.

Next, the systems of the invention will be employed to build libraries that incorporate spectra, structures and biological activity of a large number of opioid compounds, using the vast dataset generated by our high-throughput screening approach. This will represent a major improvement in the forensic capabilities for early detection of new synthetic opioids, allowing a rapid and informed response after the introduction of new substances to the street drug market. These libraries would also allow insights into opioid chemical and biochemical activity and into their relationship with molecular structure, particularly through in silico studies based on novel ab initio calculations and machine learning.

In the course of pursuing these two specific aims, we will test the hypothesis that structure/activity relationships exist among non-addictive compounds with high-potency for pain suppression and that this connection might be manifest also in the opioid receptor agonist/antagonist characteristics. Additionally, as outputs of the project, we expect i) a set of characterized (structure and bioactivity) new opioids with high potential as effective pain medications or overdose treatments, and ii) guidance on optimum synthesis conditions that should allow rapid scale-up and further testing. As am additional ancillary output, iii) we expect that the comprehensive library of new synthetic opioids that relates structures, bioactivities and spectra (MS/MS and Raman) will extend current datasets for opioid detection, improving the forensic abilities to detect new introductions of opioids in street drug supplies. These outcomes reflect the translational focus of our proposal to address the opioid crisis. Finally, it is envisioned that the systems of the invention will provide a unique platform capable of automated high-throughput synthesis, analysis and property screening.

In order to address the progressing and evolving opioid epidemic, the problem must be attacked from multiple angles. In particular, a delicate balance should be maintained between the access to pain treatment and the prevention of the epidemic. In this regard, one of the most urgent subjects to address is the availability of safer pain medications. Developing non-addictive but high-potency opioid analgesics is fundamental considering that around one third of the US population has reported experiencing chronic pain and that pain relief is a vital component of healthcare. In this context, our proposed study aims to contribute significantly by implementing a rapid and high-throughput platform for the synthesis, characterization and bioactivity screening of a vast number of new opioids. In particular, the assessment of cytotoxicities, together with binding affinities and agonist/antagonist characteristics toward diverse opioid receptors, should provide high-interest candidates as potential non-addictive pain medications that then can be taken through further biological and clinical studies. Additionally, our platform will provide information on synthetic route optimization through the high-throughput reaction screening—optimal conditions can be translated for scaled-up production in an appropriate regulated facility (not ours). Moreover, the use of this high-throughput approach will provide additional candidates, for example identifying strong μ-antagonists as high-potency, overdose reversal treatments. This is a second crucial target in the fight against the opioid crisis, which is related to the inefficiency of common antagonists (e.g., naloxone) to overpower the potent effects of such synthetic opioids as fentanyl and some of its analogs, a major problem especially in a setting where immediate and effective treatment is required. Therefore, it is notable how our high-throughput platform could contribute greatly to both safer pain medication and more efficient overdose reversal strategies, improving patient care and saving lives. Additionally, it is remarkable how rapidly such reaction screening can be carried out (current synthesis screening rate is up to 6,144 reactions per hour) and in ultra-small quantities (expressed as 'make-to-measure' in the sense that we will synthetize just enough to evaluate structure and bioactivity).

A third relevant issue within the opioid crisis is related to forensic capabilities for detection of new synthetic opioids. Currently, library matching is performed to match the analytical information obtained from the compounds in a sample (i.e., retention times, mass-to-charge ratios, MS/MS fragments). This procedure only works if the analytes have been previously characterized and are among the database entries. However, the main concern comes from new compounds clandestinely synthetized and introduced onto the streets. Those unscheduled substances are often undetected in conventional drug screening tests, and thus can lead to fatal outbreaks before they are detected adequately. This was the case with fentanyl (2006), acetylfentanyl (2013), carfentanyl (2016) and U47700 (2016) in the US. Here, we propose to use the large amounts of data collected from the high-throughput synthesis and characterization of numerous new opioids, to create extensive spectral libraries that contain analytical data for new synthetic drugs not yet introduced onto the streets. In this way, law enforcement and public health authorities would have early capabilities to detect new compounds in the drug supplies, and therefore prevent potential outbreaks.

Overall, our proposed research strategy seeks to contribute to non-addictive pain medication, high-potency overdose reversal treatment and effective detection of new opioid introductions. Thus, our study represents a translational multi-targeted research approach based on chemical experiments that address several critical aspects of a multi-faceted chemical crisis—the opioid epidemic. Ultimately, by improving the access of (i) patients to safer analgesics, (ii) first responders to effective overdose reversal interventions, and (iii) coincidentally, law enforcement to extensive tools for early detection of new synthetic opioids, we are holistically facing this public health emergency and contributing to its faster resolution.

Example 2

The research approach we propose is graphically depicted as a workflow in FIG. 11B, focusing on: (i) high-throughput synthesis and in situ characterization (structure and bioactivity) of a large number of opioids, and (ii) creation of extensive libraries that incorporate spectra, structures and biological activity of a large number of opioids. The different activities are described in the following Examples.

Example 3

High-throughput chemical transformations will be performed on molecular scaffolds selected for their pharmacological and especially opioid relevance, so as to build a large group of such compounds. The starting materials will be based on literature searches, but some might be suggested by collaborators. The transformations will be performed on a nanogram scale, with product characterization by automated MS and MS/MS using the high-throughput chemical module of the systems of the invention. Reactions will be accelerated in the droplets generated in the course of DESI analysis. A wide range of conditions (stoichiometry, solvent, pH, catalyst, etc.) will be evaluated so that the rapid MS analysis can be used to identify the conditions that yield the highest relative amounts of products of the highest purity. This selection of reaction conditions is itself a purification step, because only mixtures that yield products with enough purity will undergo further steps. MS/MS will be used to confirm identity in this stage. The aim at this point will be to generate small amounts of derivatized compounds in modest purity for in situ bioactivity screening (hot-spots).

Figure 12:
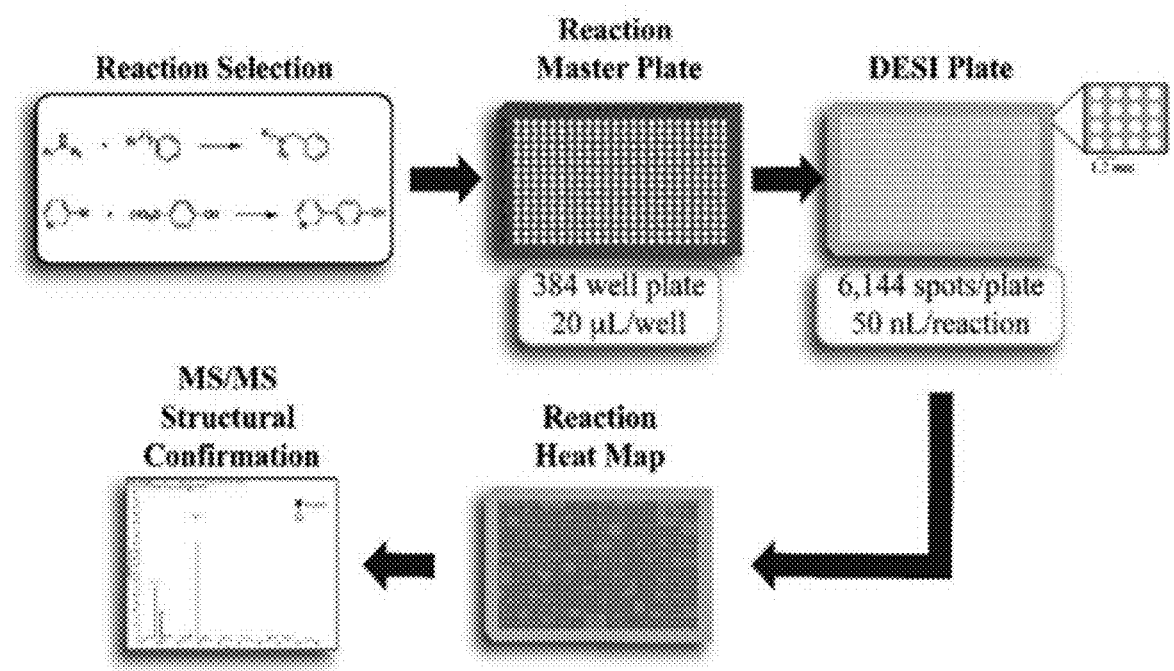
FIG. 12 illustrates an exemplary workflow in the chemical synthesis module.

The chemical module typically follows three main steps for automated, high-throughput reaction screening, as shown FIG. 12. (i) Reaction solutions are added to a 384-well master reaction plate by an automated liquid handling system; then, after mixing, small amounts of the reaction mixtures are spotted onto a microtiter plate using a commercial robotic plating system (Beckman Biomek i7), which allows spotting reaction volumes as low as 5 nL with 100-µm positional accuracy and densities up to 6,144 reaction spots per plate. (ii) The DESI source is scanned across the plate to desorb and accelerate the reactions, whose products are then sampled and analyzed by the mass spectrometer. DESI allows a scan speed of up to 6,144 spots per hour, and also rapid solvent switching that can tailor the DESI conditions to maximize signal on the fly. (iii) The spectra obtained are analyzed using CHRIS, a homebuilt software package that assigns peak intensities and turns them into yes/no (or a finer grained) outputs for each spot on the plate, creating a heat-map. If the output is positive, the spot may be re-analyzed to obtain structural characterization (MS/MS).

We note that, compared to traditional structure-activity relationship approaches, our high-throughput strategy stands out for its speed and operation in the nanogram scale. The small scale is a considerable advantage when considering the legal regulations of the compounds of interest. Additionally, working in this scale makes our method a 'make-to-measure' strategy in which compounds are synthesized on the smallest possible scale, only enough to interrogate them for useful information regarding spectroscopic properties and bioactivity.

The success of this methodology has been proven with the exploration of Suzuki cross-couplings, N-alkylation of alkyl bromides, nucleophilic aromatic substitutions (SNAr) and N-acylations, amongst others. A specific example is the rapid but extensive screening of optimized conditions (solvent, concentration and nitrosation reagent) for a new synthesis of Lomustine, an important agent for the treatment of brain tumors and Hodgkin's disease. Examples of some potentially relevant molecular scaffolds and transformations for this project are provided in Table 1.

TABLE 1

| Molecular Scaffolds | | Transformations | |
| --- | --- | --- | --- |
| Quinazoline | Indoles | N-alkylation | Phenol alkylation |
| Morpholines | Piperazines | Reductive amination | C-C Coupling |
| Triazoles | Piperidines | N-acylation | $S_NAr$ |
| Morphinans | Benzomorphans | Amide formation | Ester formation |

Example 4

The properties of the new opioid compounds (hot-spots) produced by modifying the molecular scaffolds of interest, will be initially examined, without further modification, in an on-line, high-throughput fashion. In this first characterization stage, cytotoxicity and binding affinity to opioid receptors will be determined, both being essential parameters to evaluate the potential efficiency of the newly synthetized compounds. To achieve high-throughput screening of these properties, the systems of the invention allows collection of the synthetized products using a DESI-spray-angle switching approach (FIG. 4A). In short, a new DESI stage, with two positions (analysis: close to the MS inlet, and collection: away from the MS) will be used. The analysis position will be used for reaction screening in high-density plates, while the collection position will be used to deposit the product on lower-density well-plates. With this approach, perhaps 10% of the reactions screened would yield hot-spots in a typical plate, and approximately 1-2 ng of product will be deposited.

Cytotoxicity will be assessed by the combined alamar-Blue and CFDA-AM assays (FIGS. 4A, 5, and 6), a combination widely recognized for its relative low cost, simplicity, reproducibility and sensitivity. Together these tests assess both metabolic activity and membrane integrity. The assay is implemented in a high-throughput fashion by coupling a fluorescence micro-plate reader within the system, whose control is incorporated into the existing and already automated system. In particular, the plate of collected products would be transferred by the robotic arm of the chemical synthesis module and/or fluidic handling apparatus of the control module to an external incubation position, where the opioids will be incubated overnight with cultured cells of established lines (e.g., 3T3, HaCaT, HepG2)—the incubation module. Then, the incubated plate would be transferred by the same robotic arm to the tray of the fluorescence reader (configured as a characterization position). In the reader, and using the instrument's built-in reagent dispensers, shaker and incubator, the assay reagents will be added, and the cultures will be incubated for 1-4 h prior to reading. All these events will be programmed and triggered by the control module, which will also handle the collected data.

The binding affinity of the compounds to different opioid receptors will be evaluated using an on-line, competitive binding assay (FIGS. 4A, 5, and 6). In these experiments, using the multi-channel, DESI liquid-handling system, reconstituted membrane preparations of opioid receptors and an opiate peptide specific for each receptor (e.g. DAMGO for the μ-OR), will be added to the spray-deposited compounds just after collection and without removing the plate from the collection position. Then, the plate will be transferred to the incubation position by the robotic arm. After quenching the incubation with cold buffer, the wells will be screened by the chemical synthesis module. Using DESI, the concentration of the free opiate peptide (i.e., the competitor of the compound of interest) can be determined. This in turn allows estimation of the binding affinity of the analyte—the larger the free peptide concentration, the higher the affinity of the opiate analyte towards the receptor. Note that this approach follows the chemical principles of well-established protocols for determining opioid binding affinities, but it stands in contrast to traditional methods that used radiolabeled compounds and scintillation counting. Using DESI-MS for the assay simplifies the procedure, allows high-throughput screening, and removes the need for purchasing and using radioactive substances. This proposed strategy will be validated by assessing general trends on the binding affinity of known opiates and corroborating them with information available in the literature. Additionally, positive (i.e., known opioid receptor strong agonists and antagonists) and negative controls (non-opioid compounds) will be tested as part of the experimental validation.

Compounds that demonstrate both non-cytotoxicity and high binding affinities will be considered high-interest candidates, and they will be selected to undergo the following stage, using their optimal synthesis conditions (i.e., which yielded the hot-spot) with prolonged spray-deposition times so that 10-20 ng are collected in low-density plates.

The high-interest candidate compounds will be characterized in situ by Raman spectroscopy, by coupling a Raman microplate reader to the system as another characterization position that is accessible to the robotic arm (second characterization position; FIG. 8A). The control of the reader would be completely integrated into the control module. In cases of interest, ex situ NMR characterization might also be possible with the sub-mg amounts of product that will be collected in this stage. The acquisition of the Raman spectrum of the high-interest candidate compounds has two main benefits: (i) further structural characterization and comparison with the theoretical spectrum to confirm product identity, and (ii) addition of the Raman spectra to the proposed extensive library of opioids. This is highly relevant to expanding the forensic capabilities for opioid detection, especially considering that the Scientific Working Group for the Analysis of Seized Drugs (SWGDRUG) states that two analytical techniques must be used for seized drug analysis, a requirement that can be satisfied easily coupling Raman and MS. Therefore, the availability of both Raman and MS/MS spectra of a large number of opioids represents a clear advantage for library matching in forensics, especially for not-yet-introduced synthetic compounds, which then would be identified and confirmed earlier, satisfying current regulations.

Finally, in this stage the agonist/antagonist character of the high-interest candidates will be assessed (FIGS. 9-10). This is relevant because high-affinity, opioid receptor ligands can induce different types of responses on the receptor upon binding. In the case of opioid receptors, which are part of the seven transmembrane-spanning, G protein-coupled receptor superfamily, their activation implies a conformational change in the G protein associated to the receptor. This change initially induces the release of guanidine diphosphate (GDP) and the uptake of its triphosphate analogue (GTP), which then leads to the dissociation of the G protein α and βγ subunits and, consequently, to further downstream metabolic effects, ultimately resulting in the macro-effects of opioid consumption like analgesia and euphoria. Agonists of the opioid receptors (e.g., morphine, fentanyl) induce this response upon binding, while antagonists (e.g., naloxone), despite being well bound to the receptor, do not generate the same effect. That is why strong antagonists are used in the treatment of opioid overdoses, while partial agonists are part of the opioid dependency/addiction handling. Therefore, the discrimination of strong/weak agonists/antagonists is an important task that can be accomplished by evaluating the activation response that the opioid analyte induces after binding.

The opioid receptor activation assay will be carried out by incubating the high interest target with different opioid receptor membrane preparations in the presence of GTPγS (a non-hydrolyzable analog of GTP), so that upon activation the opioid receptor G protein complex releases GDP to the medium and takes up GTPγS, reducing its free concentration. Similarly to the binding affinity assay, the reagents/receptor would be added by the DESI liquid-handling system in the collection position. Then, the plate will be transferred back and forth to the incubation position, and GTPγS is determined using DESI. In this case, the reduction in its concentration will be correlated with the degree of opioid receptor activation that is induced by binding of the opioid compound of interest. In addition, the increase in GDP level can be monitored, so that there are two molecular indicators of receptor activation. Larger changes in any of those indicators will imply a stronger agonist character of the opiate analyte, while no changes compared to a negative control would represent a strong antagonist character (by this stage, all the high-interest candidates will have been screened as high-affinity ligands to opioid receptors). The degree of activation induced by each analyte will then be assigned relative to known strong agonists/antagonists. These known compounds will also be tested, and their relative degrees of activation benchmarked with the trends reported in the literature, as validation of the proposed methodology. As with the binding assays, it is relevant to highlight that the method proposed follows chemical relationships used in well-established protocols, but simplifies the workflow by removing the use of radiolabeled materials, and brings the advantage of high-throughput screening by systems of the invention.

By evaluating their biological agonist or antagonist character (for different opioid receptors), the candidate molecules can be efficiently directed to further studies according to their potential, for instance μ-opioid receptor strong antagonists as potential high-efficiency overdose reversal treatments. There is great value behind this biological characterization of the large number of interest compounds synthesized with our high-throughput approach. In particular, this value is apparent because it has been widely recognized that the pharmacodynamics of opioids, even closely structurally related ones, can be completely different, and therefore they may induce diverse responses, for instance, higher or comparable antinociception but less addiction. Furthermore, this rapid, high-throughput and unbiased testing of the activity of multiple compounds on different receptors, stands in contrast to the traditional studies of archetypical compounds, primarily on μ-opioid receptor, and the extrapolation of those conclusions to the structurally-related families. Our approach has the potential to more readily reveal novel potential candidates for pain or overdose treatment and so add insight into the still evasive relationship between structure and bioactivity of opioids.

Example 5

The data regarding structure, spectra and biological activity of a large number of opioids, will be properly handled and efficiently interconnected in order to generate a database of new synthetic opioids (FIG. 11A). This is possible thanks to the integration of all the different instruments under a unique platform with a common control system. The availability of an extended library system with compounds not yet present in the street drug market, obtained with our high-throughput screening approach, represents an advantage for early detection of recently introduced synthetic opioids. Additionally, the opportunity will exist for performing identification/confirmation using two different analytical techniques—MS/MS and Raman.

Example 6

Ab initio calculations will be performed and will include: (i) generate confidence in the structure of the experimentally considered molecules, (ii) predict the molecular interactions with opioid receptors, and (iii) train machine learning algorithms on the simulations to find promising agonist and antagonist molecule candidates. Early calculations will apply known Discrete Fourier Transform (DFT) tools to predict Raman spectra. Novel quantum mechanics and molecular dynamics calculations that address the significant gap of an accurate treatment of the deep molecular environment will be used to predict and compare binding affinities of the new opioids to opioid receptors. Besides DFT tools, we plan to use novel algorithms based on non-equilibrium Green's functions (NEGF) that are fast and able to consider solvent and surrounding molecules explicitly. These tools close the gap of finite temperature and energy exchange in molecular processes, whereas state-of-the-art DFT tools consider only perfectly frozen structures that do not allow for energy exchanges between the molecules and their environment. Open boundary conditions that are integrated in these tool suites should successfully simulate structures significantly larger than state-of-the-art DFT tools can cover; thus, opioid receptors and interacting opioids can be congruently simulated in full quantum mechanical description. Additionally, deep learning methods and neural-network-based models will be implemented to uncover the structure-bioactivity relationship among the new opioids and to facilitate the prediction of biochemical properties of new compounds prior to their synthesis. This type of predictive power would be achieved by the algorithm, if trained with a large and comprehensive enough dataset that would be fed by the high-throughput platform. These algorithms will benefit approximate models, such as partially charge self-consistent DFT, to obtain rapid and approximate guesses, so that the closer the molecule candidates meet the requirements, the more sophisticated the searching models that can be applied. This type of capability would allow both the rapid identification of unknown opioids in mixtures, as well as assisting in silico to define non-addictive, high-potency, pain relief compounds.

Example 7

We recognize that there will be some items for additional consideration. First, the low purity of the hot-spots. This difficulty can be addressed by purification both physically (the reaction mixture) and digitally (the MS/MS spectra). The physical clean-up can be carried out in situ by scaling-up the synthesis of product in heated microtiter plates and on-line purifying the product using microscale solid phase extraction. Digital cleaning will be performed by appropriate spectral manipulation, with emphasis on prioritizing the information in the mass-to-charge values rather than on the intensity scale. However, we expect that, with the high-throughput evaluation of several reaction conditions, some spots will yield relatively pure product. Second, the possible gaps in coverage of potential compounds with our synthetic approach. We consider that this problem will be mitigated by our ongoing efforts to expand the types of reactions and scaffolds that can be screened using the systems of the invention. Third, the absence of standards in our high-throughput screening strategy. In this case, if semi-quantitative analysis is required, for example to evaluate and compare product yields of different hot-spots, we plan to pre-load appropriate internal standards into the microtiter plates. Fourth, the requirement for larger amounts of compounds for the proposed bioassays due to sensitivity limits. If necessary, more material can simply be made by prolonging the spray deposition time using the optimized synthesis conditions (e.g., the ones which yielded the hot-spots). Even under this scenario, the amounts of material will still be below the low milligram level, and we will work with regulators to ensure even these amounts are appropriately handled. If even larger quantities (tens of milligrams) are required for further assays or extensive biological studies, like studies on pain suppression and addiction propensity, there are regulatory barriers that would need to be addressed. The scientific barriers are a lesser concern; scale-up from high-throughput screening to flow chemistry has already been demonstrated in several small molecule syntheses.

Figure 7:
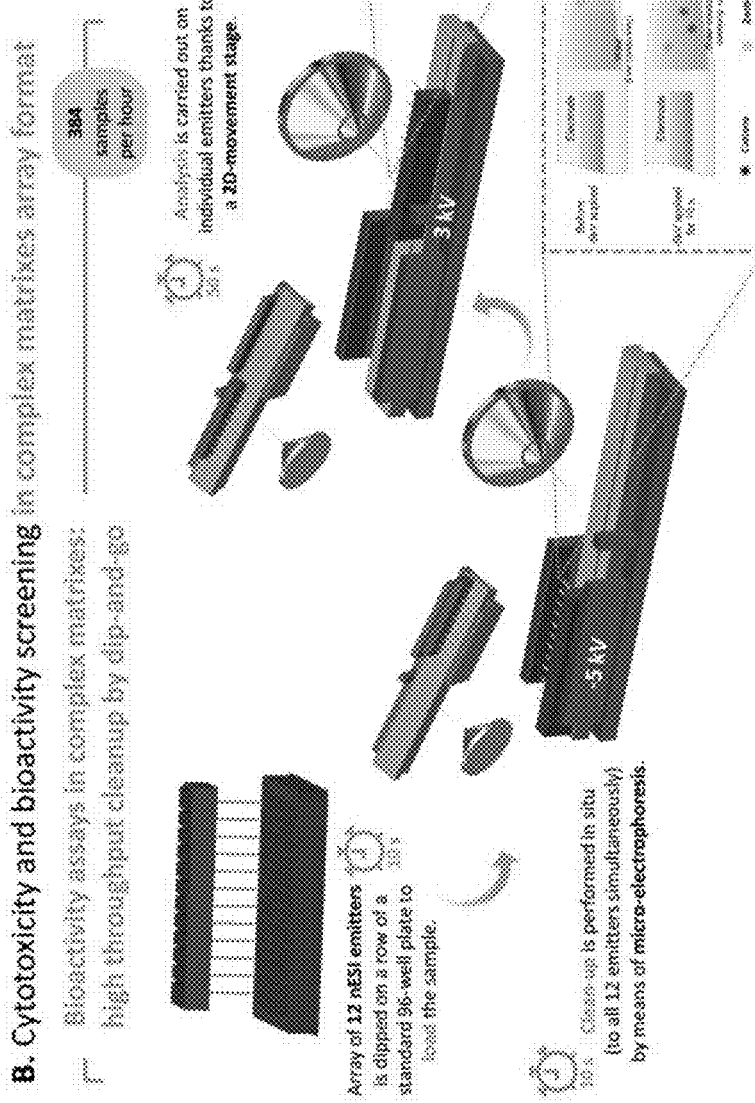
FIG. 7 shows a multiplexed inductive nano-electrospray and micro-electrophoresis apparatus to achieve rapid in situ sample clean-up and ionization using small volume samples.
Figure 13:
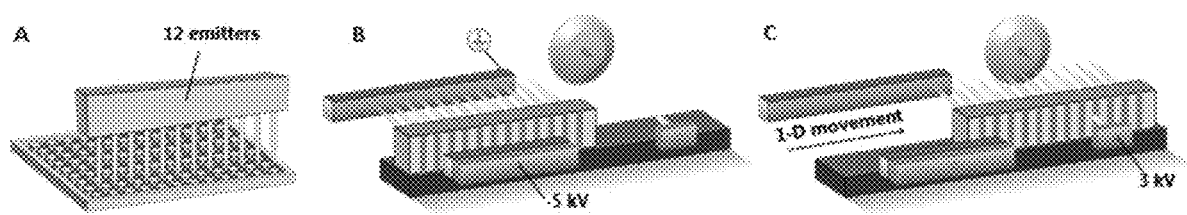
FIG. 13 panels A-C show a dip-and-go multiplexed nanoESI System. Panel A) Tip loading of the nanoESI emitters from 96-well plates (10 s). Panel B) In situ electrophoretic clean-up; note that it is performed simultaneously to all the emitters (10 s). Panel C) Sequential MS analysis of the emitters (40 s). All times given are for 12 emitters.

Finally, we recognize that the complexity of the matrix may complicate use of DESI for the biological assays due to ionization suppression or high chemical noise. In this regard we propose to use a multiplexed nano-electrospray approach, dip-and-go for analyzing complex mixtures directly from microtiter plates (FIGS. 7 and 13 panels A-C). This system couples multiplexed inductive nano-electrospray and micro-electrophoresis, to achieve rapid, in situ sample clean-up and ionization using small volume samples (50 nL). The samples in the wells of the microtiter plate are loaded into a custom-made array of emitters, by simply immersing the emitters into the sample solutions. The capillary force of aspiration loads 50 nL to 100 nL of sample solution, depending on the size of the emitter tips (20 μm to 35 μm diameter). Additionally, the use of field amplification allows ultra-sensitive analysis (1 nM in biological media). The practicability and performance of this system has already been proven by its successful use in the bioactivity assessment of drugs that inhibit the enzyme BACE1, a target for Alzheimer's disease. Inhibition curves were acquired in almost two orders of magnitude less time, as compared to LC-MS (360 samples/h vs. 8 samples/h), and with identical results. Also, removal of matrix peaks as well as signal-to-noise enhancement (from <3 to 20 in full scan mode) was observed, with a 100-fold increase in the analyte signal caused by: (i) the stacking effect of field amplification electrophoresis, and (ii) the improvement of ion suppression effect after the in situ electrophoretic clean-up. This strategy would be implemented in an automated fashion such that the plate transport, the fluidics, the instrumentation and the data from the dip-and-go system, would be controlled completely by the software of the control module. Further, this mitigation strategy would be implemented using a different mass spectrometer, particularly an available quadrupole time-of-flight (qToF).

Incorporation by Reference

References and citations to other documents, such as patents, patent applications, patent publications, journals, books, papers, web contents, have been made throughout this disclosure. All such documents are hereby incorporated herein by reference in their entirety for all purposes.

Equivalents

The invention may be embodied in other specific forms without departing from the spirit or essential characteristics thereof. The foregoing embodiments are therefore to be considered in all respects illustrative rather than limiting on the invention described herein.

What is claimed is:

1. A method for forming a chemical product and conducting one or more biological assays on the chemical product, the method comprising:
    forming a chemical product in a desorption electrospray ionization (DESI) droplet product from directing a DESI spray from a DESI source onto a substrate to desorb and ionize chemical molecules and form the chemical product, wherein the forming step is conducted for each spot from a surface of an array of spots;
    analyzing the chemical product in a mass spectrometer;
    collecting the chemical product;
    incubating the chemical product with one or more biological molecules; and
    analyzing results of the incubation of the chemical product with the one or more biological molecules;
    wherein all steps of the method are performed by an integrated synthesis and analysis system that comprises a fluid handling apparatus comprising one or more robotic instruments configured to handle and move the chemical product through each step of the method and a control module comprising software to control and coordinate operation of each of the method steps.

2. The method of claim 1, wherein the control module further comprises software that generates a heat map of the chemical product from each spot to illustrate successful formation of the chemical product for each spot.

3. The method of claim 2, wherein the software analyzes the heat map and determines which chemical products should be rescanned for structural information.

4. The method of claim 1, wherein the forming step further utilizes:
    a two-position DESI stage wherein a first position is configured for analysis of the chemical product and is proximate an inlet of the mass spectrometer and a second position located away from the inlet of the mass spectrometer; and
    a switch controlled by the control module to switch between the first and second position.

5. The method of claim 1, wherein the incubating is for one or more biological assays selected from the group consisting of: cytotoxicity, enzyme reactivation, antibiotic activity, binding affinity, enzyme inhibition, antiviral activity, agonism/antagonism, and blood/brain barrier penetration.

6. The method of claim 1, wherein the method further comprises a second characterization step in a second characterization position that is accessible by the fluid handling apparatus of the control module and that can be operable coupled to the control module.

7. The method of claim 6, wherein the second characterization comprises an analysis by Raman spectroscopy.

8. The method of claim 1, wherein analyzing results of the incubation comprises use of a multiplexed inductive nano-electrospray and micro-electrophoresis apparatus to achieve rapid in situ sample clean-up and ionization using small volume samples.

9. The method of claim 8, wherein the control module controls operation of the multiplexed inductive nano-electrospray and micro-electrophoresis apparatus.

10. The method of claim 1, wherein the chemical product is comprises a non-addictive pain medication.

\* \* \* \* \*